(12) United States Patent
Wutz et al.

(10) Patent No.: US 6,929,881 B2
(45) Date of Patent: Aug. 16, 2005

(54) CONNECTION FOR JOINING A CURRENT COLLECTOR TO A TERMINAL PIN FOR A PRIMARY LITHIUM OR SECONDARY LITHIUM ION ELECTROCHEMICAL CELL

(75) Inventors: Philip S. Wutz, Williamsville, NY (US); Shenandoah Hennrich, Williamsville, NY (US); John Skoumpris, Amherst, NY (US)

(73) Assignee: Wilson Greatbatch Technologies, Inc., Clarence, NY (US)

(*) Notice: Subject to any disclaimer, the term of this patent is extended or adjusted under 35 U.S.C. 154(b) by 430 days.

(21) Appl. No.: 10/207,608

(22) Filed: Jul. 29, 2002

(65) Prior Publication Data

US 2003/0022062 A1 Jan. 30, 2003

Related U.S. Application Data (60) Provisional application No. 60/308,763, filed on Jul. 30, 2001.

(51) Int. Cl.$^7$ ............................................. H01M 2/02
(52) U.S. Cl. ........................... 429/178; 429/90; 429/92; 429/110
(58) Field of Search ............................ 429/90, 92, 110, 429/178

(56) References Cited

U.S. PATENT DOCUMENTS

| | | | |
|---|---|---|---|
| 4,203,201 A | * | 5/1980 | Mead et al. ............... 29/623.1 |
| 4,233,372 A | | 11/1980 | Bro et al. |
| 4,859,547 A | | 8/1989 | Adams et al. |
| 5,312,458 A | | 5/1994 | Muffoletto et al. |
| 5,716,422 A | * | 2/1998 | Muffoletto et al. ........ 29/623.5 |
| 5,750,286 A | | 5/1998 | Paulot et al. |
| 6,030,723 A | | 2/2000 | Nagano et al. |

FOREIGN PATENT DOCUMENTS

EP 0 532 312 A1 3/1993

* cited by examiner

*Primary Examiner*—Dah-Wei Yuan
(74) *Attorney, Agent, or Firm*—Michael F. Scalise (57) ABSTRACT

A rod-shaped coupler for connecting a current collector to a terminal pin, is described. The coupler is secured to the entire width of the current collector, preferably the cathode in a cell of a case negative design, and is generally aligned along the longitudinal axis of the electrode assembly. An extension portion of the coupler extends beyond the electrode assembly and is of a hollow, tubular structure crimped or otherwise collapsed into surrounding contact with the terminal pin. The coupler and terminal pin are then welded together. Preferably, the terminal pin is roughened prior to effecting the connection. This method of attachment is suitable for either primary lithium or secondary lithium ion cells, particularly those powering implantable biomedical devices.

35 Claims, 4 Drawing Sheets

CONNECTION FOR JOINING A CURRENT COLLECTOR TO A TERMINAL PIN FOR A PRIMARY LITHIUM OR SECONDARY LITHIUM ION ELECTROCHEMICAL CELL

CROSS REFERENCE TO RELATED APPLICATION

This application claims priority based on U.S. provisional application Ser. No. 60/308,763, filed Jul. 30, 2001.

BACKGROUND OF THE INVENTION

1. Field of the Invention

The present invention generally relates to the conversion of chemical energy to electrical energy and, more particularly, to the connection of a current collector for one of the electrodes of an electrochemical cell to its terminal pin by an intermediate coupler. Preferably, the current collector and terminal pin are of dissimilar conductive materials. The novel coupler of the present invention is particularly useful for joining a cathode current collector to a molybdenum terminal pin.

2. Prior Art

Recent rapid developments in small-sized electronic devices having various shape and size requirements necessitate comparably small-sized electrochemical cells of different designs that can be easily manufactured and used in these electronic devices. This is particularly the case in implantable biomedical devices such as hearing-assist devices, neurostimulators, pacemakers, drug pumps, cardiovascular defibrillators, and left ventricular assist devices. Preferably, the electrochemical cell is of a high energy density, such as afforded by lithium systems, whether they be of the primary or the secondary type. One commonly used cell configuration is a prismatic, case-negative cell design having an intermediate cathode flanked by opposed anode portions in contact with the casing and in electrical association with the cathode. The prismatic electrode assembly is typically of either a relatively elongated anode folding into a serpentine configuration with a plurality of cathode plates interleaved between the folds or of alternating anode and cathode plates.

Figure 1:
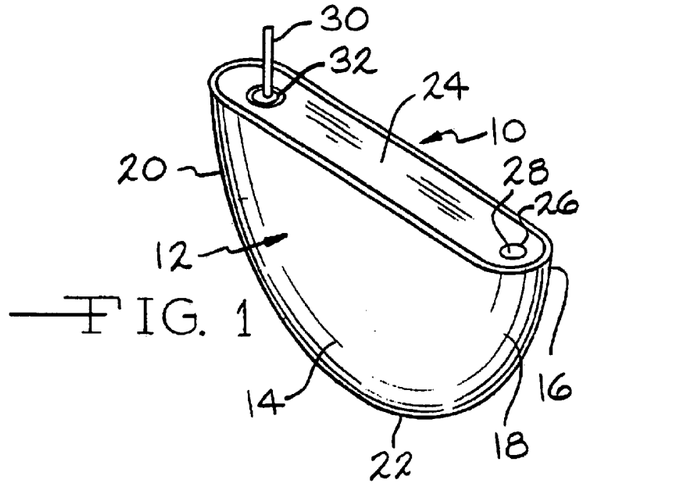
FIG. 1 is a perspective view of a prismatic electrochemical cell 10.

A perspective view of a typical prismatic electrochemical cell 10 is shown in FIG. 1. The cell 10 includes a casing 12 having spaced-apart front and back side walls 14 and 16 joined by curved end walls 18 and 20 and a curved bottom wall 22. The casing has an open top closed by a lid 24. Lid 24 has an opening 26 used for filling the casing 12 with an electrolyte after the cell components have been assembled therein and lid 24 has been welded to casing 12. In its fully assembled condition shown in FIG. 1, a closure means 28 is hermetically sealed in opening 26 to close the cell. A cathode terminal lead 30 is electrically insulated from lid 24 and casing 12 by a glass-to-metal seal 32, as is well known to those skilled in the art.

Figure 2:
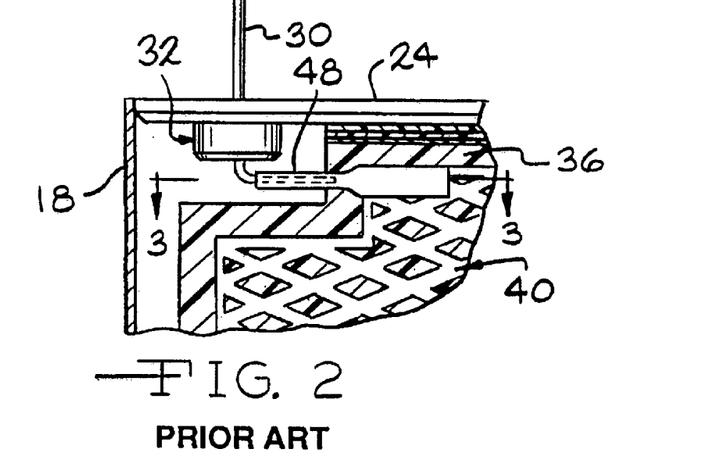
FIG. 2 is a partial cross-sectional view of a cell having a current collector 40 connected to a terminal pin 30 through a coupling element 48 according to the prior art.
Figure 3:
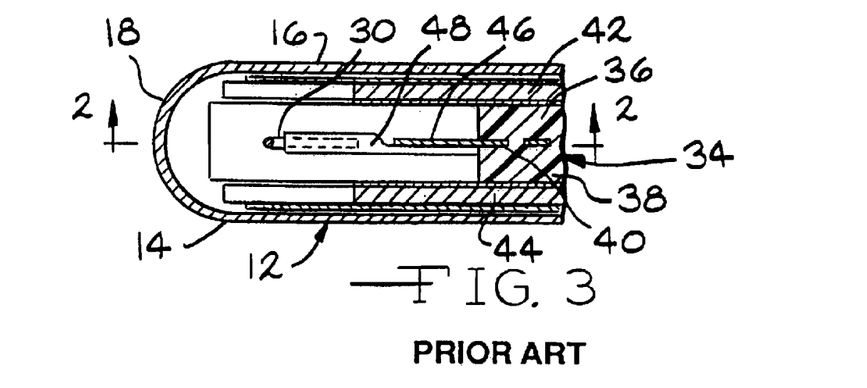
FIG. 3 is a cross-sectional view taken along line 3—3 of FIG. 2.

U.S. Pat. No. 5,250,373 to Muffoletto et al. describes a prismatic cell having the cathode terminal lead 30 connected to a cathode current collector. This patent is assigned to the assignee of the present invention and incorporated herein by reference. As shown in FIGS. 2 and 3, the prior art cell has a casing 12 housing a multi-plate electrode assembly of a cathode electrode 34 in electrical association with an anode electrode. Cathode 34 comprises plates 36, 38 pressed together and bonded against a cathode current collector 40 while the anode comprises anode plates 42 and 44 in operative contact with the respective cathode plates 36, 38.

The cathode current collector 40 is provided with a tab 46 extending outwardly therefrom. A distal end of tab 46 is welded to a planar end of a coupler 48. The other end of the coupler comprises a tube that receives the inner end of the terminal pin 30 welded therein. Pin 30 provides an external electrical connection to the cathode 34 while the casing 12 and lid 24 are in electrical contact with the anode and serve as the anode terminal for this case-negative electrochemical cell 10.

This prior art construction provides a reliable means of connecting the cathode terminal pin 30 to the current collector 40 in a multi-plate electrode assembly housed in a prismatic casing. However, in a jellyroll or flat-folded electrode assembly, a coupler having a shape extending along the longitudinal axis of the electrode assembly is more suitable. In that respect, the coupler of the present invention comprises a rod shape extending generally parallel to the longitudinal axis of the electrode assembly. This provides a greater surface area for connection to the one electrode for which it serves as the terminal as well as providing increased contact surface area for electron flow.

SUMMARY OF THE INVENTION

In contrast to the Muffoletto et al. patent having the coupler secured to the cathode current collector by a "point contact", i.e., the tab 46 welded to the planar end of coupler 48, the present invention relates to a rod-shaped coupler secured to the entire width of the current collector of one of the electrodes. Preferably, the present coupler is for the cathode in a cell of a case negative design and provides for connecting to its terminal pin. The coupler is generally disposed aligned along the longitudinal axis of the electrode assembly. An extension portion of the coupler extends beyond the electrode assembly and is of a hollow, tubular structure crimped or otherwise collapsed into surrounding contact with the terminal pin. The coupler and terminal pin are then welded together. Preferably, the terminal pin is roughened prior to effecting the connection.

Having the coupler aligned along the longitudinal axis of the electrode assembly and connected to the entire width of the cathode current collector provides a robust connection between the terminal pin and the current collector. This, in turn, provides for increased surface area for electron flow from the current collector to the terminal pin.

The foregoing and additional advantages and characterizing features of the present invention will become clearly apparent upon a reading of the following detailed description together with the included drawings.

DETAILED DESCRIPTION OF THE PREFERRED EMBODIMENTS

Referring now to FIGS. 4 to 7, an electrochemical cell 50 according to the present invention is shown. The cell 50 comprises a casing 52 having spaced apart first and second side walls 54 and 56 extending to and meeting with opposed end walls (not shown) and a bottom wall 58. The end walls can be curved to provide the casing having an oval cross-section, or they can be generally planar to provide a rectangular cross-section. Alternatively, the casing sidewall can be cylindrical. A still further alternate casing embodiment is of mating clam shells, as described in U.S. application Ser. No. 09/757,232, filed Jan. 9, 2001, which is assigned to the assignee of the present invention and incorporated herein by reference. In any event, the casing sidewall forms an opening 60 leading into its interior.

Cell 50 includes an anode electrode 62 and a cathode electrode 64 prevented from contacting each other by an intermediate separator 66. The anode 62 and cathode 64 are provided as relatively elongated structures comprising an active material contacted to a conductive current collector (not shown in FIG. 4). The anode 62 and cathode 64 are then overlaid, one on top of the other with the intermediate separator 66 and wound into a jellyroll configuration.

Before winding, however, an end portion 68 of the cathode current collector 70 (FIG. 5) is left bare, uncovered by cathode active material. Suitable materials for the current collector 70 are selected from the group consisting of stainless steel, titanium, tantalum, platinum, gold, aluminum, cobalt nickel alloys, nickel-containing alloys, highly alloyed ferritic stainless steel containing molybdenum and chromium, and nickel-, chromium- and molybdenum-containing alloys.

Figure 5:
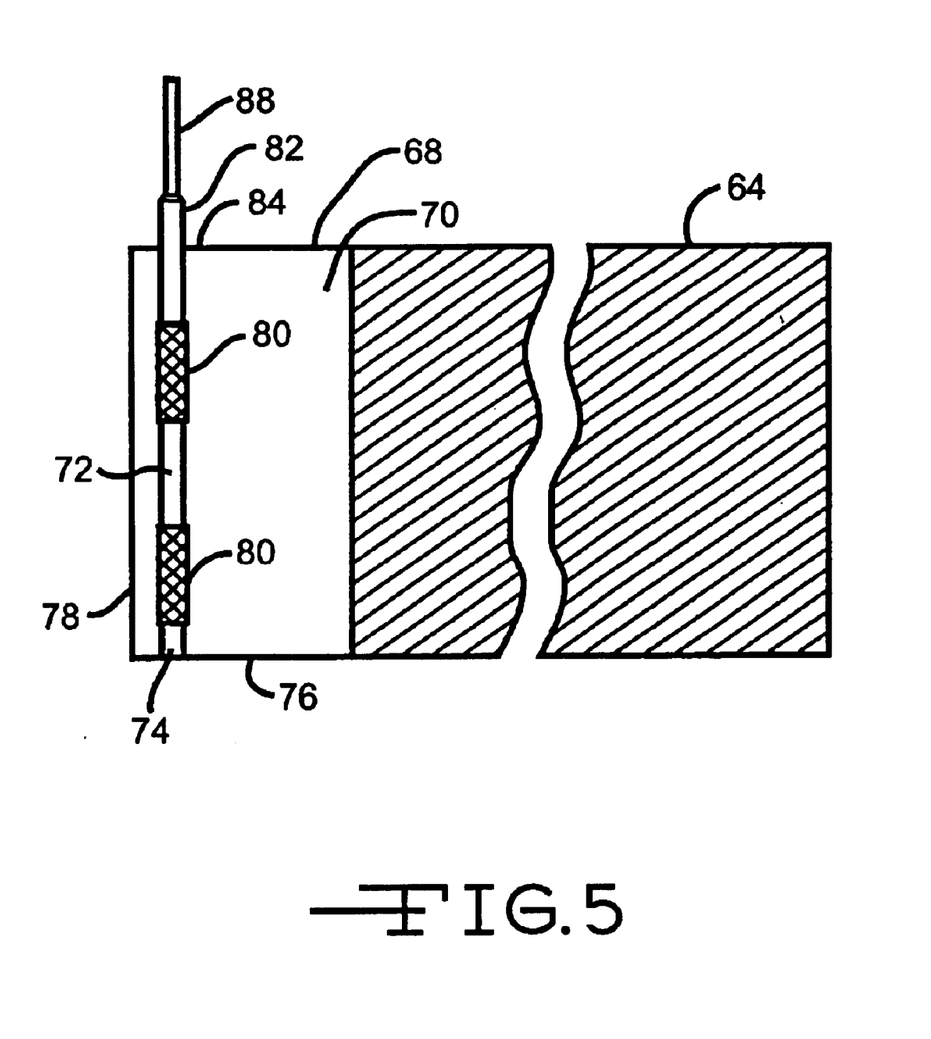
FIG. 5 is a side elevational view of the present coupler 72 contacted to the cathode current collector 70 of cathode 64.

As shown in FIG. 5, a bar-shaped sleeve or coupler member 72 is secured to the bare current collector portion 68 with its longitudinal axis aligned parallel to the short axis of the current collector 70. The coupler is of a conductive material preferably selected from the group consisting of stainless steel, titanium, tantalum, platinum, gold, aluminum, cobalt nickel alloys, nickel-containing alloys, highly alloyed ferritic stainless steel containing molybdenum and chromium, and nickel-, chromium- and molybdenum-containing alloys. Preferably, the material of the current collector 70 is the same as that of the coupler 72.

Figure 4:
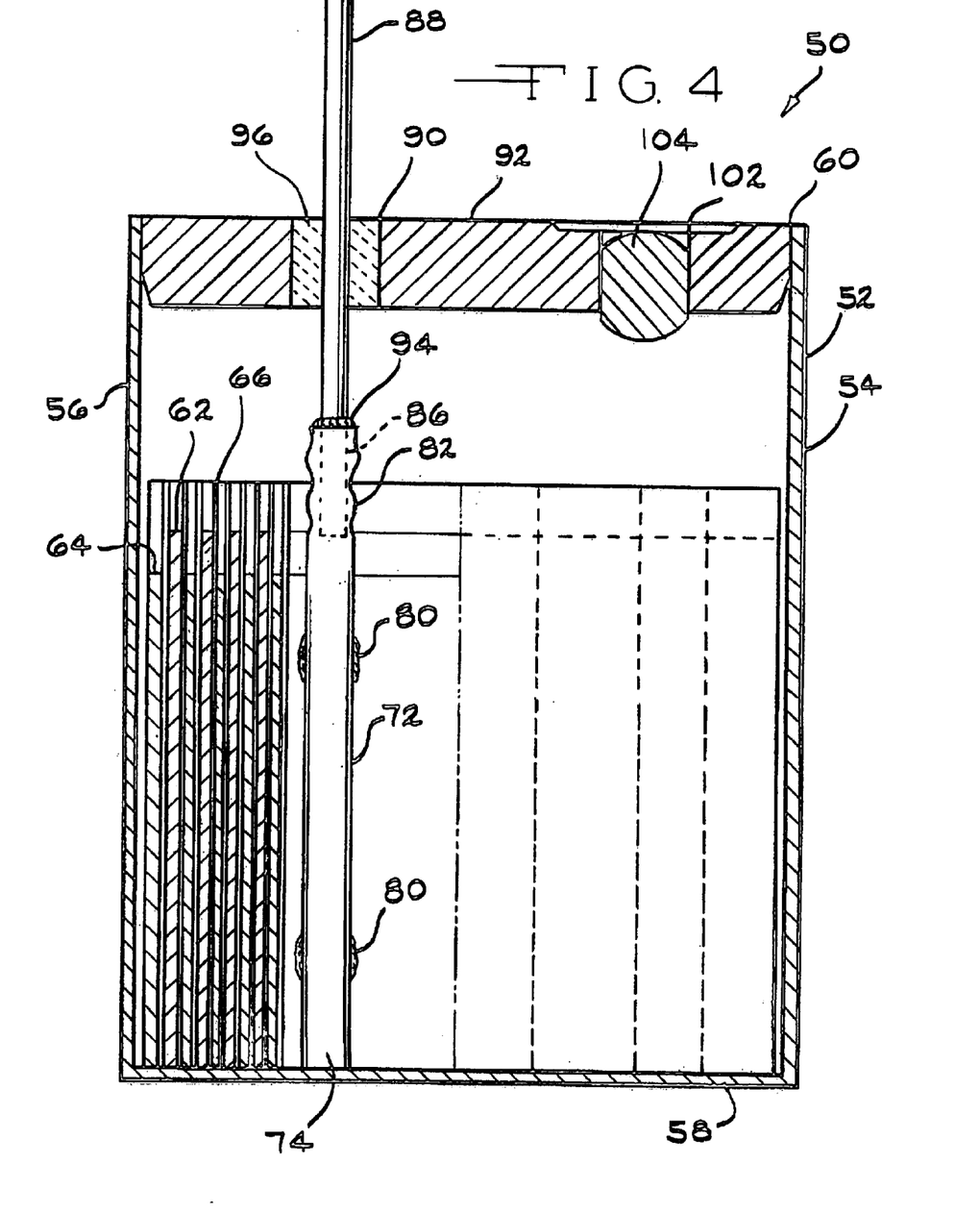
FIG. 4 is a cross-sectional view of an electrochemical cell 50 according to the present invention including a coupler 72 for connecting a cathode current collector 70 to a terminal pin 80.

A distal end 74 of the coupler 72 is flush with the distal edge 76 of the current collector 70. The coupler 72 is spaced from the end 78 of the bare portion 68 and welded 80 thereto, such as by ultrasonic welding and the like. The overlaid anode/cathode assembly is then wound into the jellyroll or flat-folded configuration shown in FIGS. 4, 6 and 7. The exemplary electrode assembly shown in FIG. 4 is that of a secondary cell, such as of a carbonaceous material/LiCoO$_2$ couple where it is desirable to have the lithiated cathode active material completely bounded by anode material. An exemplary flat-folded electrode configuration is shown in U.S. Pat. No. 5,776,628 to Kraft et al., which is assigned to the assignee of the present invention and incorporated herein by reference.

Figure 7:
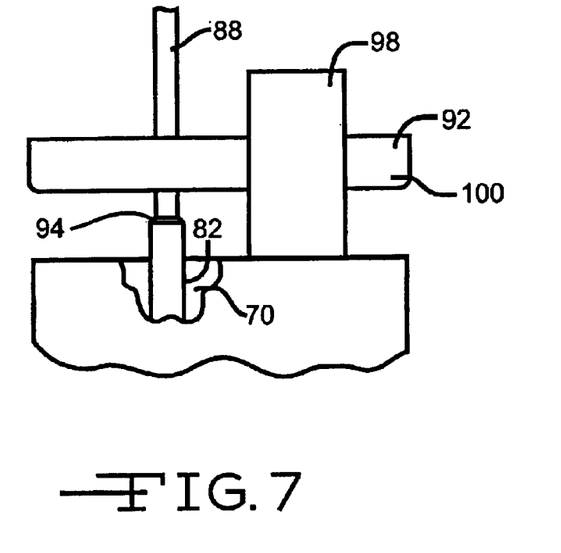
FIG. 7 is an exploded side elevational view, partly broken away, of the electrode assembly of FIG. 6 with the terminal pin 88 secured to the coupler 72 of the cathode 64.

As shown in FIGS. 4, 5, and 7, the coupler 72 has a proximal portion 82 extending beyond the proximal edge 84 of the current collector 68. The coupler 72 is hollow along its length, however, that is not necessary. What is important is that for the length of the proximal portion 82 and a relatively short distance into the interior of the current collector 68, the coupler is hollow to receive and house the distal end 86 of a terminal pin 88.

Also, the coupler 72 is shown having a circular cross section. That is not necessary. Alternate embodiments of the coupler have a triangular cross section or even one that is multisided such as a pentagonal shape. What is important is that the cross sectional shape of the coupler match that of the terminal pin for maximizing member to member contact.

An important aspect of the present invention is that the terminal pin 88 is roughened before its distal end 86 is inserted into the coupler 72. Then, the proximal portion 82 of the coupler is crimped, swaged or otherwise collapsed into a force fit contact with the roughened distal end 86 of the terminal pin 88. A weld 94 completes the connection between the crimped coupler and the terminal pin. A suitable roughening technique is to grit blast the pin with aluminum oxide, or in the case of a molybdenum pin, a molybdenum material. For an as received terminal pin having a surface roughness of about 8 micrometers or less, the grit blasting is to provide a surface roughness of about 32 micrometers, or greater.

As shown in FIG. 4, the terminal pin 88 is received in an opening 90 in a lid 92 for casing. A glass material 96 insulates the terminal pin 88 from the lid 92. This assembly is commonly referred to as a glass-to-metal seal. A major portion of the terminal pin extends beyond the upper surface of the lid 92 for connecting a load powered by the cell.

If desired, a sleeve (not shown) is fitted over the terminal pin 88 where it passes through the glass-to-metal seal. The sleeve is welded to the pin at both of its ends and provides for improved sealing of the glass 96 to the terminal pin. This is especially important if the terminal pin has been roughened. While roughening is important for improved contact to the coupler, it can detract from sealing contact with the insulating glass.

Figure 6:
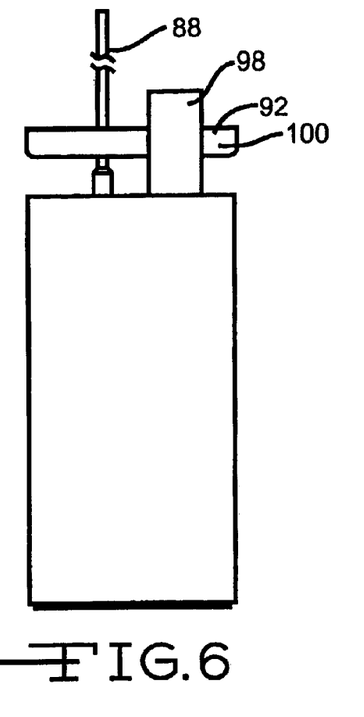
FIG. 6 is a side elevational view of an electrode assembly according to the present invention, including the terminal pin 88 and lid 92, before they are housed in a casing 52.

As shown in FIGS. 6 and 7, a connector tab 98 extends from the anode current collector (not shown) to overlay a sidewall 100 of the lid 92. That way, when the electrode assembly connected to the lid 92 is fitted to the open end 60 of the casing, the tab 96 is captured between the lid and the casing. Then, lid 92 is hermetically sealed to the casing such as by laser welding, and the like. This provides the cell having a case-negative configuration.

Those skilled in the art will readily recognize that the cell can also be provided in a case-positive configuration. In that manner, the cathode is connected to the casing 52 as its terminal and the anode current collector is connected to the coupler 72 connected to the terminal pin 88.

An important aspect of the present invention is that the coupler 72 is particularly preferred for connecting a current collector of a first metal to a terminal pin of a second, dissimilar metal. Terminal pins are typically of molybdenum. It is often difficult to weld or otherwise connect molybdenum to metals typically used for either anode or cathode current collectors. For this reason, the combination of a roughened terminal pin surrounded by a coupler crimped and then welded together provides a robust connection having structural integrity and which facilitates electron flow.

As previously described with respect to the prior art cell of FIGS. 2 and 3, the electrode assembly is activated by an electrolyte filled in the casing through a fill opening 102 in the lid 92. Fill opening 102 is closed by a closure member 102, hermetically sealed therein.

The current invention is applicable to either primary or secondary electrochemical cells. A primary electrochemical cell that possesses sufficient energy density and discharge capacity for the vigorous requirements of implantable medical devices comprises a lithium anode or its alloys, for example, Li—Si, Li—Al, Li—B and Li—Si—B. The form of the anode may vary, but preferably it is of a thin sheet or foil pressed or rolled on a metallic anode current collector, i.e., preferably comprising titanium, titanium alloy or nickel. Copper, tungsten, aluminum and tantalum are also suitable materials for the anode current collector. In the exemplary cell of the present invention, the anode component has the extended tab 98 or lead of the same material as the anode current collector, i.e., preferably nickel or titanium integrally formed therewith such as by welding and contacted by a weld to the cell case 52 in a case-negative electrical configuration.

The cathode of a primary cell is of electrically conductive material, preferably a solid material. The solid cathode may comprise a metal element, a metal oxide, a mixed metal oxide and a metal sulfide, and combinations thereof. A preferred cathode active material is selected from the group consisting of silver vanadium oxide, copper silver vanadium oxide, manganese dioxide, cobalt nickel, nickel oxide, copper oxide, copper sulfide, iron sulfide, iron disulfide, titanium disulfide, copper vanadium oxide, and mixtures thereof.

Before fabrication into an electrode for incorporation into an electrochemical cell, the cathode active material is mixed with a binder material such as a powdered fluoro-polymer, more preferably powdered polytetrafluoroethylene or powdered polyvinylidene fluoride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium and stainless steel. The preferred cathode active mixture thus includes a powdered fluoro-polymer binder present at about 3 weight percent, a conductive diluent present at about 3 weight percent and about 94 weight percent of the cathode active material.

The cathode component may be prepared by rolling, spreading or pressing the cathode active mixture onto a suitable current collector. The preferred current collector material is aluminum, although titanium is suitable as well. Cathodes prepared as described are preferably in the form of a strip wound with a corresponding strip of anode material in a structure similar to a "jellyroll" or a flat-folded electrode stack.

In order to prevent internal short circuit conditions, the cathode is separated from the anode by the separator 66. The separator is of a fabric woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C. H. Dexter, Div., Dexter Corp.).

A primary electrochemical cell includes a nonaqueous, ionically conductive electrolyte having an inorganic, ionically conductive salt dissolved in a nonaqueous solvent and, more preferably, a lithium salt dissolved in a mixture of a low viscosity solvent and a high permittivity solvent. The salt serves as the vehicle for migration of the anode ions to intercalate or react with the cathode active material and suitable salts include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

Suitable low viscosity solvents include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy,2-methoxyethane (EME), ethyl methyl carbonate, methyl propyl carbonate, ethyl propyl carbonate, diethyl carbonate, dipropyl carbonate, and mixtures thereof. High permittivity solvents include cyclic carbonates, cyclic esters and cyclic amides such as propylene carbonate (PC), ethylene carbonate (EC), butylene carbonate, acetonitrile, dimethyl sulfoxide, dimethyl, formamide, dimethyl acetamide, γ-valerolactone, γ-butyrolactone (GBL), N-methyl-pyrrolidinone (NMP), and mixtures thereof. The preferred electrolyte for a lithium primary cell is 0.8M to 1.5M $LiAsF_6$ or $LiPF_6$ dissolved in a 50:50 mixture, by volume, of PC as the preferred high permittivity solvent and DME as the preferred low viscosity solvent.

By way of example, in an illustrative case negative primary cell, the active material of cathode body is silver vanadium oxide as described in U.S. Pat. Nos. 4,310,609 and 4,391,729 to Liang et al., or copper silver vanadium oxide as described in U.S. Pat. Nos. 5,472,810 and 5,516,340 to Takeuchi et al., all assigned to the assignee of the present invention, the disclosures of which are hereby incorporated by reference. Cathode current collector 70 is of aluminum and terminal lead 88 is of molybdenum, separator 66 is of polypropylene, glass seal 96 is of TA-13 hermetic sealing glass, and closure means 104 is of stainless steel.

In a liquid cathode/electrolyte or catholyte type primary cell, for example a lithium-oxyhalide cell, liquid catholyte fills the casing interior and is in operative contact with the anode 62 and with the cathode element comprising the cathode current collector 70 sandwiched between opposed carbonaceous plates. Separator 66 is disposed between the anode 62 and the cathode current collector 70. For a more detailed description of such a liquid electrolyte cell references may be made to U.S. Pat. No. 4,246,327 to Skarstad et al., which is assigned to the assignee of the present invention, the disclosure of which is hereby incorporated by reference.

The present invention is also applicable to a lithium ion cell. In secondary electrochemical systems, the anode electrode comprises a material capable of intercalating and de-intercalating lithium. An anode material comprising any of the various forms of carbon (e.g., coke, graphite, acetylene black, carbon black, glassy carbon, pitch carbon, synthetic carbon, mesocarbon microbeads (MCMB), and mixtures thereof, which are capable of reversibly retaining lithium, is preferred. Graphite is particularly preferred due to its relatively high lithium-retention capacity. A typical secondary cell anode is fabricated by mixing about 90 to 97 weight percent graphite with about 3 to 10 weight percent of a binder material which is preferably a fluoro-resin powder such as polytetrafluoroethylene (PTFE), polyvinylidene fluoride (PVDF), polyethylenetetrafluoroethylene (ETFE), a polyamide or a polyamide, and mixtures thereof. To form an anode electrode, this active admixture is supported on a metallic current collector of a thin foil of copper, nickel, nickel plated steel, stainless steel or titanium, with copper being preferred. The current collector may also be chemically etched, perforated, or of expanded metal screen and the carbonaceous anode mixture is contacted to the current collector by casting, pressing, rolling or otherwise contacting the active admixture thereto.

Also in secondary systems, the positive electrode preferably comprises a lithiated material that is stable in air and readily handled. Examples of such air-stable lithiated cathode active materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and $LiCo_{1-x}Ni_xO_2$.

An electrolyte is required to activate the anode/cathode combination in the secondary system. A suitable electrolyte for this purpose is described in U.S. application Ser. No. 09/669,936, which is assigned to the assignee of the present invention and incorporated herein by reference.

In addition to the present coupler/terminal pin assembly providing a robust connection structure of increased electron flow path, it also provides a failsafe feature. In the case the interface between the coupler and the terminal pin becomes partially separated, for example the weld breaks, total cell failure is prevented by the surrounding relationship of the coupler about the pin. This ensure some degree of contact simply because the pin is captured inside the coupler.

Now, it is therefore apparent that the present invention accomplishes its intended objects. While embodiments of the present invention have been described in detail, which is for the purpose of illustration, not limitation.

What is claimed is:

1. An electrochemical cell, comprising:
   a) a casing;
   b) an electrode assembly housed inside the casing, the electrode assembly comprising a first electrode, a second electrode and an intermediate separator wound together and having a first longitudinal axis, wherein the first electrode is of a first electrode active material and is connected to the casing serving as its terminal, and wherein the second electrode includes a second current collector comprising a peripheral edge surrounding a major portion contacted with a second electrode active material and a minor portion;
   c) a terminal pin insulated from the casing and having a first end disposed inside the casing and a second, outer end for connection to a load;
   d) a coupler having a length extending along a second longitudinal axis between a distal portion contacted to the minor portion of the second current collector and a proximal portion extending beyond the peripheral edge of the second current collector and contacted to the first end of the terminal pin, wherein the second longitudinal axis of the coupler is parallel to the first longitudinal axis of the wound electrode assembly; and
   e) an electrolyte provided in the casing to active the electrode assembly.

2. The electrochemical cell of claim 1 wherein the minor portion of the second current collector is devoid of active material.

3. The electrochemical cell of claim 1 wherein the proximal portion of the coupler is a hollow tube that surrounds the first end of the terminal pin.

4. The electrochemical cell of claim 1 wherein at least the first end of the terminal pin is roughened to about 32 micrometers, or greater.

5. The electrochemical cell of claim 1 wherein the first electrode comprises a first current collector contacted with the first electrode active material on at least one of its major sides and the second electrode comprises the second current collector having the second electrode active material contacted to at least one of its major sides.

6. The electrochemical cell of claim 5 wherein the first electrode comprises a first length extending between first and second ends meeting spaced apart first and second edges with a third axis of the first electrode extending to the first and second edges being perpendicular to the first length, and wherein the second electrode comprises a second length extending between third and fourth ends meeting spaced apart third and fourth edges with a fourth axis of the second electrode extending to the third and fourth edges being perpendicular to the second length.

7. The electrochemical cell of claim 6 wherein with the first and second electrodes provided in the wound electrode assembly, the third axis of the first electrode is substantially parallel to the fourth axis of the second electrode.

8. The electrochemical cell of claim 6 wherein with the first and second electrodes provided in the wound electrode assembly, the second longitudinal axis of the coupler member is substantially parallel to the respective third and fourth axes of the first and second electrodes.

9. The electrochemical cell of claim 1 wherein the wound electrode assembly is of either a jellyroll or flat-folded configuration.

10. The electrochemical cell of claim 1 wherein the first end of the terminal pin is received in an opening in the proximal portion of the coupler collapsed into surrounding contact with the terminal pin.

11. The electrochemical cell of claim 1 wherein the minor portion of the current collector and the distal portion of the coupler are of the same material.

12. The electrochemical cell of claim 1 wherein the coupler is of a conductive material selected from the group consisting of stainless steel, titanium, tantalum, platinum, gold, aluminum, cobalt nickel alloys, nickel-containing alloys, highly alloyed ferritic stainless steel containing molybdenum and chromium, and nickel-, chromium- and molybdenum-containing alloys.

13. The electrochemical cell of claim 1 wherein the current collector is of a conductive material selected from the group consisting of stainless steel, titanium, tantalum, platinum, gold, aluminum, cobalt nickel alloys, nickel-containing alloys, highly alloyed ferritic stainless steel containing molybdenum and chromium, and nickel-, chromium- and molybdenum-containing alloys.

14. The electrochemical cell of claim 1 wherein the terminal pin is of a conductive material selected from the group consisting of molybdenum, niobium, tungsten, and mixtures thereof.

15. The electrochemical cell of claim 1 of a primary chemistry with the first electrode being of lithium and the second electrode having a cathode active material selected from the group consisting of silver vanadium oxide, copper silver vanadium oxide, manganese dioxide, cobalt nickel, nickel oxide, copper oxide, copper sulfide, iron sulfide, iron disulfide, titanium disulfide, copper vanadium oxide, and mixtures thereof.

16. The electrochemical cell of claim 1 of a secondary chemistry with the second electrode of a cathode active material selected from the group consisting of oxides, sulfides selenides, and tellurides of metals selected from the group consisting of vanadium, titanium, chromium, copper, molybdenum, niobium, iron, nickel, cobalt and manganese.

17. The electrochemical cell of claim 1 of a secondary chemistry with the first electrode of an anode material selected from the group consisting of coke, graphite, acetylene black, carbon black, glassy carbon, hairy carbon, and mixtures thereof.

18. The electrochemical cell of claim 1 wherein the couple has a cross-sectional shape selected from the group consisting of cylindrical, triangular and multi-sided.

19. The electrochemical cell of claim 1 wherein the casing is selected from the group consisting of a cylindrical casing, a prismatic casing and mating clam shells.

20. An electrochemical cell, comprising:
   a) a casing;
   b) an electrode assembly housed inside the casing, the electrode assembly comprising a first electrode, a second electrode and an intermediate separator, wherein the first electrode is of a first electrode active material and is connected to the casing serving as its terminal, and wherein the second electrode includes a second current collector comprising a peripheral edge surrounding a major portion contacted with a second electrode active material and a minor portion;
   c) a terminal pin insulated from the casing and having a first end disposed inside the casing and a second, outer end for connection to a load;
   d) a coupler having a length extending between a distal portion contacted to the minor portion of the second current collector and a proximal portion extending beyond the peripheral edge of the second current collector and contacted to the first end of the terminal pin; and
   e) an electrolyte provided in the casing to active the electrode assembly.

21. The electrochemical cell of claim 20 wherein the extending proximal portion of the coupler provides for contacting it to the first end of the terminal pin after the first and second electrodes along with the intermediate separator are provided in the electrode assembly.

22. The electrochemical cell of claim 20 wherein the electrode assembly is in either a jellyroll or flat-folded configuration.

23. The electrochemical cell of claim 20 wherein the first end of the terminal pin is received in an opening in the proximal portion of the coupler collapsed into surrounding contact therewith.

24. The electrochemical cell of claim 20 wherein the proximal portion of the coupler is welded to the first end of the terminal pin.

25. A method for providing an electrochemical cell, comprising the steps of:
   a) providing a first electrode;
   b) providing a second electrode having a second current collector comprising a peripheral edge surrounding a major portion contacted with a second electrode active material and a minor portion;
   c) providing a coupler having a length extending between a distal portion and a proximal portion;
   d) contacting the distal portion of the coupler to the minor portion of the second current collector with the proximal portion extending beyond the peripheral edge of the second current collector;
   e) contacting a first end of a terminal pin to the proximal portion of the coupler either before or after the first and second electrodes are provided as an electrode assembly with the intermediate separator preventing direct physical contact there between, the terminal pin having a second end;
   f) providing a casing;
   g) housing the electrode assembly in the casing with the first electrode connected to the casing serving as its terminal and the terminal pin being insulated from the casing with its second end extending outside the casing; and
   h) activating the electrode assembly with an electrolyte provided in the casing.

26. The method of claim 25 including providing the minor portion of the second current collector contacted by the distal portion of the coupler being devoid of active material.

27. The method of claim 25 including roughening at least the first end of the terminal pin to a roughness of about 32 micrometers, or greater.

28. The method of claim 25 including welding the proximal portion of the coupler to the first end of the terminal pin.

29. The method of claim 25 including providing the proximal portion of the coupler as a hollow tube surrounding the first end of the terminal pin.

30. The method of claim 25 wherein the first electrode comprises a first current collector contacted with a first electrode active material on at least one of its major sides and the second electrode comprises the second, elongated current collector having the second electrode active material contacted to at least one of its major sides.

31. The method of claim 30 wherein the first electrode comprises a first length extending between first and second ends meeting spaced apart first and second edges with a third axis of the first electrode extending to the first and second edges being perpendicular to the lengths and wherein the second electrode comprises a second length extending between third and fourth ends meeting spaced apart third and fourth edges with a fourth axis of the second electrode extending to the third and fourth edges being perpendicular to the second length.

32. The method of claim 31 including providing the first and second electrodes wound in the electrode assembly with the third axis of the first electrode being substantially parallel to the fourth axis of the second electrode.

33. The method of claim 31 including providing the first and second electrodes wound in the electrode assembly with the second longitudinal axis of the coupler member being substantially parallel to the respective third and fourth axes of the first and second electrodes.

34. The method of claim 25 including providing the electrode assembly in either a jellyroll or flat-folded configuration.

35. The method of claim 25 including collapsing the proximal portion of the coupler onto the first end of the terminal pin received in an opening therein.

* * * * *

UNITED STATES PATENT AND TRADEMARK OFFICE
CERTIFICATE OF CORRECTION

PATENT NO. : 6,929,881 B2
DATED : August 16, 2005
INVENTOR(S) : Wutz et al.

It is certified that error appears in the above-identified patent and that said Letters Patent is hereby corrected as shown below:

Column 7,
Line 58, "active" should read -- activate --;

Column 8,
Ines 64-65, "sulfides selenides" should read -- sulfides, selenides --;

Column 9,
Line 33, "active" should read -- activate --; and

Column 10,
Line 39, "lengths" should read -- length, --.

Signed and Sealed this

Eighth Day of November, 2005

JON W. DUDAS
*Director of the United States Patent and Trademark Office*